2 Sheets--Sheet 1.
T. CASTOR.
Street-Cars.
No. 6,057. Reissued Sept. 22, 1874.
FIG. I.
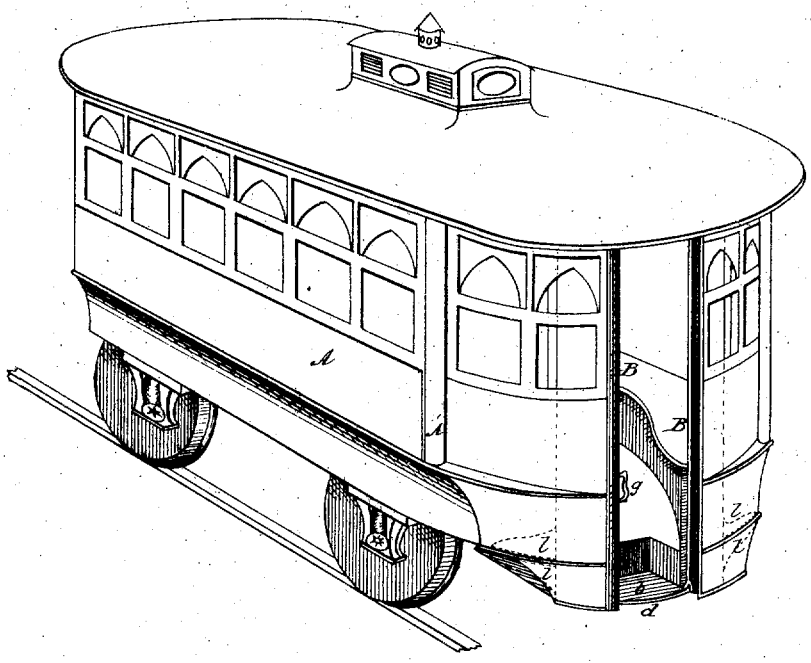
FIG. II.
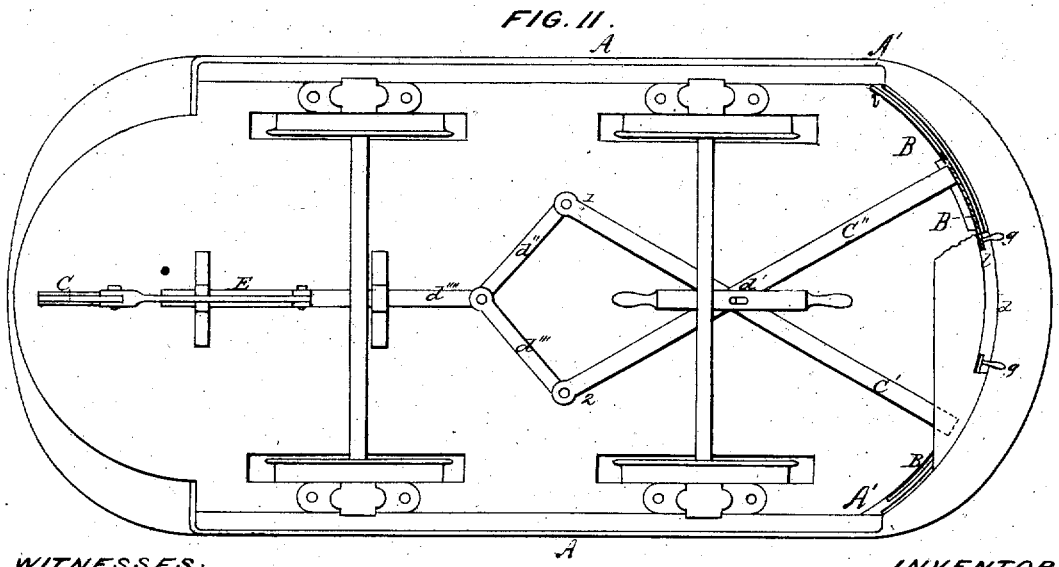
WITNESSES:
D. G. Stuart
J. Y. Knight
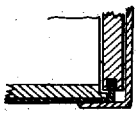
INVENTOR:
Thos Castor
Assigns by mesne assignments to John Stephenson
per P. Kenney Atty.
THE GRAPHIC CO. PHOTO-LITH. 39 & 41 PARK PLACE, N.Y.

2 Sheets--Sheet 2.
T. CASTOR.
Street-Cars.
No. 6,057.
Reissued Sept. 22, 1874.
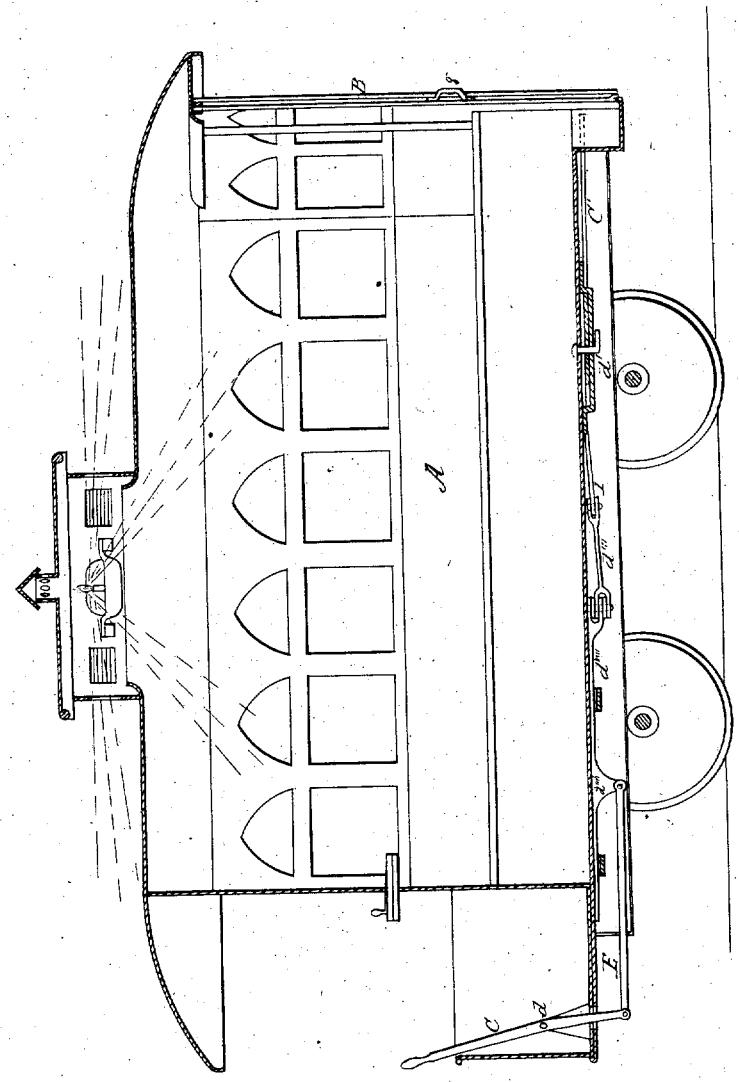
FIG. III.
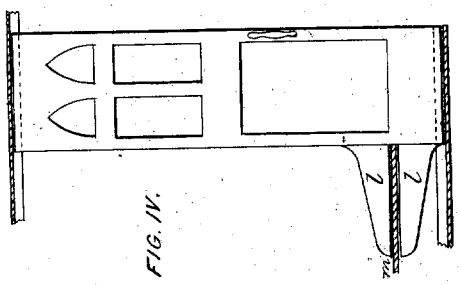
FIG. IV.
WITNESSES:
D. G. Stuart
J. G. Knight
INVENTOR:
Thos Castor
per P. Hannay
Atty.
THE GRAPHIC CO. PHOTO-LITH. 39 & 41 PARK PLACE, N.Y.

UNITED STATES PATENT OFFICE.

THOMAS CASTOR, OF PHILADELPHIA, PENNSYLVANIA, ASSIGNOR, BY MESNE ASSIGNMENTS, TO JOHN STEPHENSON, OF NEW YORK CITY.

IMPROVEMENT IN STREET-CARS.

Specification forming part of Letters Patent No. 32,681, dated July 2, 1861; reissue No. 6,057, dated September 22, 1874; application filed August 3, 1874.

DIVISION A.

*To all whom it may concern:*

Be it known that I, THOMAS CASTOR, of Philadelphia, in the State of Pennsylvania, have invented a certain new and Improved Mode of Constructing Street-Cars, of which the following is a description, reference being had to the accompanying drawing, making part of this specification, in which—

Figure 1 represents a view, in perspective, of a street-car having my improvements applied thereto; Fig. 2, a plan of the bottom or under side of the same; Fig. 3, a vertical longitudinal section of the same; and Fig. 4, an elevation and partial section of the door and its adjuncts.

This division of my original patent relates solely to a novel and improved mode of constructing the rear end of street-cars. These, as heretofore made, have been provided with square ends. Thus constructed, much trouble and annoyance have been experienced by the passengers in making their exit from, or entrance into, the cars, especially when crowded. To remedy that difficulty, and to increase the capacity of the car, with but little if any increase in its cost, and to facilitate the opening and closing of the entrance-door of the car by the driver, while at his post in front, through the instrumentality of suitable devices for the purpose, are the objects of this branch of my improvements. My invention for these purposes consists in making the car with a curved end or extension in the rear, and in arranging a sliding entrance-door therein, and also in inclosing the entrance-steps within the door.

To enable others skilled in the art to make, construct, and use my improvements, I will now proceed to describe its parts in detail, omitting a particular description of such parts as are non-essential to a full understanding of this branch of my improvements.

My improvements are more especially intended to be applied to cars having but a single driver's platform, *a*, such as those used on a continuous track, or in connection with turntables, and for that reason, as represented in the drawing, are applied to such a car. The forward end of the car, therefore, may be made of any convenient shape, such as square or round, as may be desired. The rear end, however, is rounded, and made to project beyond the ends A′ of the side walls A, so as to form an extension on the rear of the body of the car, as shown in Fig. 1. The entrance to the car is, preferably, made at or near the middle of the extension, and may be covered by a door or doors, B B.

The steps *b* that lead to the car may be made on the inside, if desired, and covered up by the door B, and which for this purpose may be extended downward, as shown in Fig. 1. This arrangement gives full control of the car to the driver, prevents accidents, as well as riding without entering the car.

By using two doors, B B, to cover the opening less motion is required to open or close them than if but one were used. *g g* represent handles, by which the passengers can open or close the doors. Devices are also shown by which the driver, while attending to his other duties in the front of the car, can also open or close the door at will. The doors B B, for this purpose, may be made to slide on a way, *d*, secured to the floor of the car in any suitable manner, and are, like the way, curved to suit the form of the end of the car.

To keep the doors steady on their ends guide-arms *b* are extended from their sides, which are made to embrace a guide-plate, *m*, secured to the end of the floor of the car. Their upper ends are also made to move in a guideway or groove formed on the inside of the rear end of the car immediately beneath the roof.

Upon the front platform, *a*, is arranged a lever, C, which moves upon a fulcrum, *d*. The lower end of this lever is connected, by a series of proper levers, with the sliding doors B B, by means of which the driver can, as before stated, open or close the entrance to the car at will while at his post in front. The system of levers here shown as used for that purpose consist of levers C′ and C″, *d″*, *d‴*, and *d⁗*, and connecting-lever E. Levers C′ and C″ are connected at one end directly to the door, and turn upon a common fulcrum, *d′*, and at their other end connect, respectively, with the one end of levers *d″* and *d‴*, the other end of each of which is pivoted to one end of lever $d''''$, and which, in turn, is connected to the lower end of lever C by a link-lever, E.

Thus connected, the operation is as follows: By moving the handle or lever C toward the body of the car, the ends 1 and 2 of levers C′ and C″ are drawn together by means of levers $d''''$, $d'''$, and $d''$, thereby closing the doors. The reverse operation will open the doors. Or the lever C upon the front platform may be connected with the doors by any other known combination of levers which will give the desired motion.

A car thus made it is evident will not only be more roomy and capacious, but much more easy of exit and of entrance to the passengers; and, in addition to these advantages, is much better adapted for the application of devices by which the driver, while at his post in front, can open or close the doors at will, than if it were made square-ended.

Having described my invention, what I claim is—

1. The combination of a street-car body with a curved rear end, and rear-entrance sliding door or doors, of conformable shape, substantially as and for the purposes set forth.

2. The combination of a street-car body with a curved rear end, rear-entrance sliding door or doors, of conformable shape, and the rear entrance-steps inside of the doorway, to be protected by the door, substantially as set forth.

3. The combination of a street-car body, a a rear-entrance sliding door, and the rear entrance steps inside of the doorway, to be protected by the door, substantially as set forth.

THOS. CASTOR.

Witnesses:
WM. HALL WAXLER,
DANIEL R. HART.